Patented Jan. 2, 1934

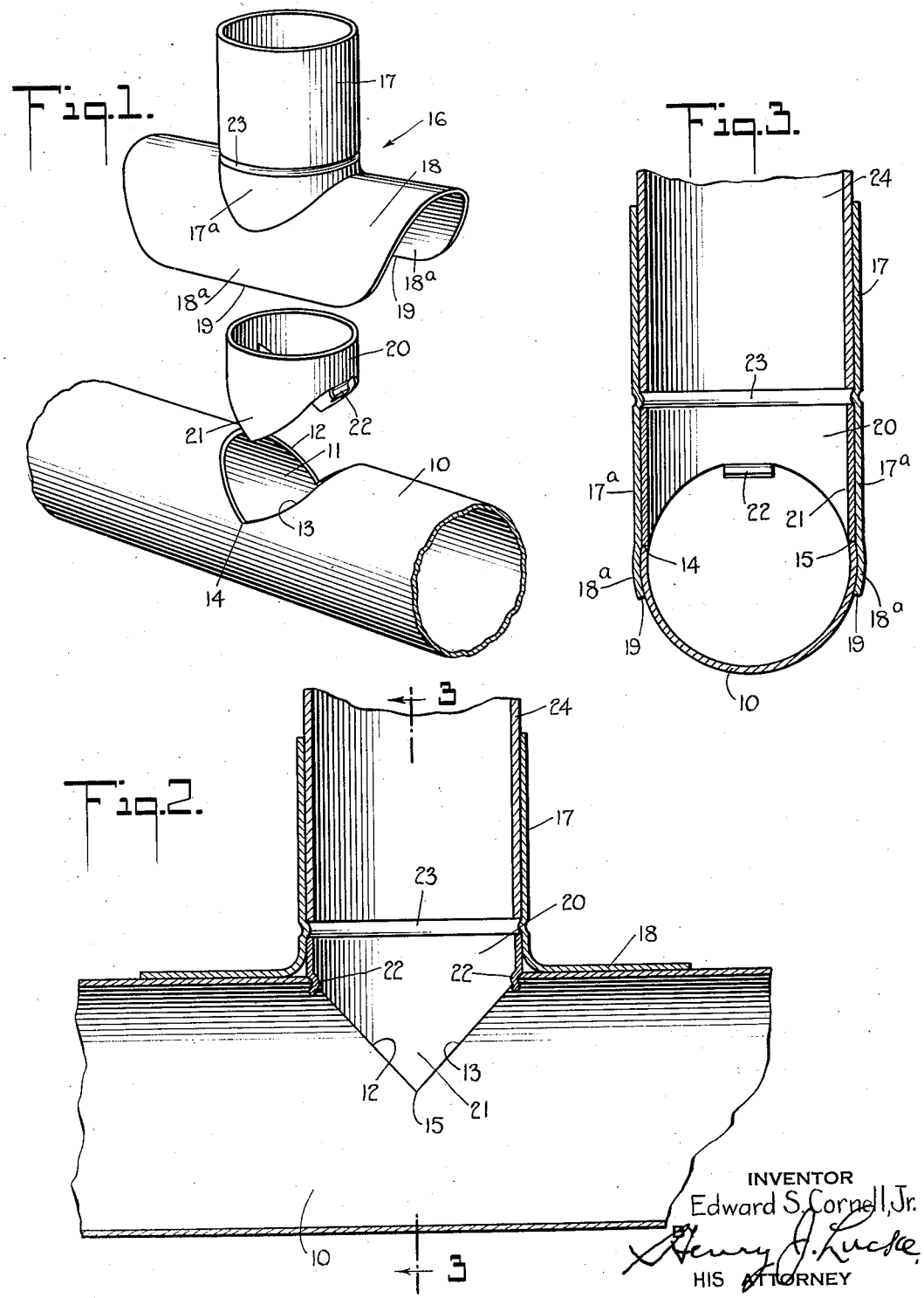

1,941,465

UNITED STATES PATENT OFFICE 1,941,465

BUILT-UP PIPE FITTING

Edward S. Cornell, Jr., Larchmont, N. Y.

Application December 16, 1931
Serial No. 581,294

4 Claims. (Cl. 285—108)

This invention relates to pipe fittings and particularly to T's, cocks, faucets and the like of the built-up type.

More particularly, my invention relates to pipe fittings of the built-up type wherein a saddle member or equivalent is employed, such member embodying a tube portion to provide for lateral flow of the contained fluid, or for housing the valve and valve stem of a cock or faucet, or the like, such member being positioned over and about an opening in a pipe or tube, and the contiguous faces sealed against leakage by a suitable bonding medium, forming joints usually termed "sweated" joints.

In the more preferred forms of the invention, the pipe is cut away to define an opening of a general wedge form the marginal edges of which extend downwardly and converge to a point on either side of the opening, and an element is interposed within and between the saddle and the pipe opening in juxtaposed relation with respect to both, whereby the saddle is definitely positioned relative to the pipe opening during the stage of building up, i. e., assembly of the fitting parts, and also to facilitate the flow of solder or other bonding medium over and between the respective contiguous faces, which medium upon cooling effects a complete seal at the joints and between the contiguous faces.

The interposed element is preferably given a configuration and contour corresponding to the portion of the pipe which is removed in the cutting operation, whereby the through bore and the lateral bore of the resulting fitting is substantially uniform in diameter and devoid of inward substantially projecting parts.

Further features and objects of the invention will be more fully understood from the following detail description and the accompanying drawing, in which Fig. 1 is a perspective, explosive view illustrating a pipe or pipe length cut to have a lateral opening, a saddle and an interposed locating member, pursuant to my invention;

Fig. 2 is a central vertical sectional view of a T resulting from the assembly of the parts illustrated in Fig. 1, Fig. 2 being on a somewhat enlarged scale;

Fig. 3 is a central sectional elevation on line 3—3 of Fig. 2.

Referring to the drawing, a length 10 of pipe or tube or the like is cut, preferably with a cutting tool for the specific purpose to provide the opening 11. Preferably, the opening 11 is of a general wedge outline and the resulting opposite edges 12, 13, tapered toward the vertical center plane of the cut. As illustrated in the drawing, the apices 14, 15 of the cut are disposed substantially diametrically relative to one another.

The saddle member 16, appropriate for a T or the like, comprises essentially a tube portion 17, preferably integrally secured to the saddle portion proper 18, the opposite lower skirt portions 18a of which are circularly inwardly continued downwardly beyond diametrically opposite locations, that is to say, their lower edges, see Fig. 3, being less than one hundred and eighty arcuate degrees, to thereby afford a snapping-on relation between the saddle member 16 and the pipe 10.

Pursuant to my invention, suitable means are provided for locating the saddle 16 relative to the opening 11. As one form of such locating means, I illustrate the member 20 arranged to be mechanically positively positioned relative to the edges of the opening 11, and preferably contoured at its opposite elongated portions 21, 21, and the opposite intermediate portions 22, 22, to substantially abut the edges 14, 15, of the opening 11, the body portion of the member 20 being of substantially circular contour snugly fitting within the tube portion 17 of the saddle member 16.

Accordingly, upon locating the positioning member 20 with respect to the opening 11 in the pipe 10, its therefrom projecting tube body portion serves to receive the tube portion 17 of the saddle member 18.

Upon thus mutually locating the saddle member 16 relative to the pipe opening, the joinder of the same and the sealing at and between the co-extensive and juxtaposed faces are effected by the use of suitable solder or other sealing medium, which assumes solid status upon cooling. Such bonding and sealing action over and between the intervening clearances between the co-extensively related and juxtaposed surfaces are of a magnitude for effecting the flow of the bonding and sealing medium by capillary and/or surface flow action.

My invention further provides for the mechanical locking of the locating member 20 relative to the pipe opening 11, as by the provision of a suitable number of lugs 22, which as illustrated in Figs. 1 and 2, may be two in number and located at an arcuate spacing of ninety degrees relative to the apices 14, 15, respectively. Preferably, such lugs 22 are arcuate in contour to provide hook elements of suitable configuration co-acting with the bevelled faces of the edges 12, 13 of the pipe opening.

In the more preferred forms of my invention, I provide the bead 23, which may be rolled in the tube portion 17 of the saddle member and disposed to abut the upper edge of the locating member 20, thereby serving as a stop for the same relative to the tube portion 17 of the saddle member. Upon sealing of the locating member, the mechanical stop reinforces the mechanical strength of the tri-partite joint.

As indicated above, it is desirable that the contour of the lower portion of the locating member conform as closely as practicable to the outline of the pipe opening 11, the general wedge formation illustrated in the drawing illustrating effectively attaining such object. However, it is apparent that other forms of contour may be employed for the locating member and the pipe opening, including dissimilar contours of the same, in which latter instance, recesses may arise between the lower edges of the locating member and the pipe opening.

From the above, it also appears that my invention as to one feature thereof results in a locating member, a preferred form of which is illustrated by the locating member 20, as an article of manufacture, which comprises the characteristics of being hollow and substantially cylindrical in contour, having an opening at one end, the edges of which extend substantially at right angles to the axis of the hollow member, the opposite end being also open, the edges of which extend in divergent directions to one another, and at angles to the axis of the hollow member. Such article of manufacture, preferably, further incorporates suitable locking elements carried by the hollow member and projecting beyond the edges, and most effectively at the apices of the divergent edges.

Pursuant to the preferred forms of my invention, as illustrated and more particularly described hereinabove, wherein similar and closely interfitting contours are employed for the pipe opening and the locating member, the inner bore of the resulting T or other pipe fitting is substantially flush notwithstanding the tri-partite assembly. Thus, upon connection of the tube portion 17 of the saddle member 16 with a pipe or tube 24, effected by suitable solder or equivalent, the bead 23 serves as a stop for the pipe end 24; the bead 23 serves the further function of substantially filling the clearance between the upper edge of the locating member 20 and the adjacent edge of the pipe 24.

In a like manner, stop cocks, faucets, etc., and other suitable types of pipe fittings providing for lateral communication with the interior of the pipe, for the insertion of the valve set, the housing of the movable valve member, etc., are constructed pursuant to the above stated principles of my invention.

My invention is adapted for the use of copper, brass and other copper alloys, aluminum and aluminum alloys, steel and steel alloys, and the like, as the material of the pipe, the saddle member and the locating member; the bonding and sealing solder or other medium is selected accordingly.

Whereas I have described my invention by specific reference to various forms thereof, it will be understood that many changes and modifications may be made without departing from the spirit of the invention.

I claim:

1. As an article of manufacture, for use in locating a saddle member with respect to an opening formed laterally in a tube, said article of manufacture having a substantially cylindrical hollow element provided with an opening at one end, the edges of which extend substantially at right angles to the axis of the hollow element, said hollow element being open at its opposite end, the edges of which extend in divergent directions, and locking elements carried by the hollow element and projecting beyond the edges at said opposite end.

2. As an article of manufacture, for use in locating a saddle member with respect to an opening formed laterally in a tube, said article of manufacture having a substantially cylindrical hollow element provided with an opening at one end, the edges of which extend substantially at right angles to the axis of the hollow element, said hollow element being open at its opposite end, the edges of which extend in divergent directions, and locking elements carried by the hollow element and projecting beyond the edges at substantially the apices of the angles of the divergent edges of said opposite end.

3. As an article of manufacture, a hollow member having openings in its body at its opposite ends, said hollow member being provided with an opening in a lateral wall of its body, the edges of said opening comprising edge portions extending in divergent directions, a lateral hollow member having edge portions extending coincidently with the edge portions of the lateral opening of a said first named hollow member and respectively having immediate engagement therewith, said lateral hollow member being provided with locking elements projecting beyond the edges of said lateral body opening, and a saddle member enveloping said lateral hollow member, said saddle member and said lateral hollow member being sealingly secured relative to one another and to the lateral wall of the first named hollow member.

4. As an article of manufacture, a hollow member having openings in its body at its opposite ends, said hollow member being provided with an opening in a lateral wall of its body, the edges of said opening comprising edge portions extending in divergent directions, a lateral hollow member having edge portions extending co-incidently with the edge portions of the lateral opening of a said first named hollow member and respectively having immediate engagement therewith, said lateral hollow member being provided with locking elements projecting beyond the edges of said lateral body opening at substantially the apices of the angles of the divergent edge portions, and a saddle member enveloping said lateral hollow member, said saddle member and said lateral hollow member being sealingly secured relative to one another and to the lateral wall of the first named hollow member.

EDWARD S. CORNELL, Jr.